United States Patent [19]

Yeckley et al.

[11] Patent Number: 5,730,345
[45] Date of Patent: Mar. 24, 1998

[54] BICYCLE RACK

[75] Inventors: Brad Yeckley, Willoughby; Karl Kennedy, Mentor; Morris George, Timberlake, all of Ohio

[73] Assignee: Acar Industries, Inc., Willoughby, Ohio

[21] Appl. No.: 727,978

[22] Filed: Oct. 9, 1996

[51] Int. Cl.⁶ .................................................... B60R 9/10
[52] U.S. Cl. ........................... 224/505; 224/521; 224/924
[58] Field of Search ........................... 224/504–8, 502, 224/521, 924

[56] References Cited

U.S. PATENT DOCUMENTS

| | | | |
|---|---|---|---|
| 2,492,841 | 12/1949 | Burkey | 224/507 X |
| 3,528,578 | 9/1970 | Schoenberger . | |
| 3,613,971 | 10/1971 | Betz | 224/505 X |
| 4,381,069 | 4/1983 | Kreck . | |
| 4,400,129 | 8/1983 | Elsenberg et al. | 224/505 X |
| 4,635,835 | 1/1987 | Cole . | |
| 4,695,218 | 9/1987 | Boyer . | |
| 4,717,054 | 1/1988 | Vanzant | 224/506 X |
| 5,029,740 | 7/1991 | Cox . | |
| 5,033,662 | 7/1991 | Godin . | |
| 5,106,002 | 4/1992 | Smith et al. . | |
| 5,181,822 | 1/1993 | Allsop et al. . | |
| 5,190,195 | 3/1993 | Fulhart et al. . | |
| 5,303,857 | 4/1994 | Hewson | 224/506 |
| 5,330,084 | 7/1994 | Peters . | |
| 5,373,978 | 12/1994 | Buttchen et al. . | |
| 5,465,564 | 11/1995 | Bianchini | 224/508 X |
| 5,469,998 | 11/1995 | Van Dusen et al. | 224/507 X |

*Primary Examiner*—Renee S. Luebke
*Attorney, Agent, or Firm*—Watts, Hoffmann, Fisher & Heinke Co., L.P.A.

[57] ABSTRACT

A bicycle carrier having a tubular base for telescopic interconnection with a receiver type trailer hitch is disclosed. A channel bracket is secured to the base and has upstanding mounting arms straddling a spaced pair of tubular uprights lower end portions which are pivotally connected to the mounting arms. An inverted channel straddles and is pivotally connected to the upright upper portions. A bicycle mounting section is secured to the channel. The section includes mechanism for securing a bicycle to the carrier for transport. The uprights, channel and section are moveable relative to the base between an upright bicycle transport position and a lowered access position. A double latching system releasably retains the carrier in its transport position. A shock absorber is interposed between the base and a first of the uprights to cushion movement from the transport to the access position.

12 Claims, 4 Drawing Sheets

BICYCLE RACK

This invention relates to bicycle carriers and more particularly to a bicycle carrier of the type mountable in a vehicle receiver style trailer hitch.

BACKGROUND OF THE INVENTION

Carriers for automotive transport of bicycles to locations where cycling tours are conducted have become quite popular. As a consequence, there have been a number of proposals for bicycle carriers of the type which are connected to a vehicle trailer hitch of the receiver type.

While bicycle carriers of this type have enjoyed increasing popularity, they are not without shortcomings. A major problem is that when the carrier is connected to a receiver hitch, the carrier and bicycle obstruct access to a vehicle trunk, to a tail gate or to a rear door.

There has been a proposal for a parallelogram type arrangement which allows the bicycles to be moved rearwardly and downwardly relative to the vehicle to facilitate vehicle rear end access. While there has been such a proposal it was not without it's own shortcomings. The entire weight of the mounted bicycles and a considerable portion of the weight of the carrier had to be resisted by an operator as the bikes were lowered. On return of the bikes and the carrier to a carrier upright position, it was necessary for the operator to lift the bicycles and a considerable portion of the carrier weight to urge the parallelogram movement back to an upright position.

Once in an upright position latching to retain the carrier in an upright position was both awkward and difficult. It was necessary to hold the carrier in a substantially upright position as a release lever was concurrently manipulated to allow spring biased pivotal lock plates to pivot into a locking position. It was also necessary to manipulate the carrier to align its support frame members with sets of lock plate notches. As an alternate it was necessary to precisely align a rod with an aperture in a base member.

SUMMARY OF THE INVENTION

A bicycle carrier made in accordance with the present invention utilizes standard tubular stock and channels. A pair of tubular uprights are pivotally connected to upper and lower channels. The lower channel is mounted on a support tube, while the upper channel supports a bicycle mounting section.

A unique positive and essentially automatic double locking action is provided. An operator on moving the carrier from a lowered position to a transport position hears two positive snapping sounds as the carrier is automatically double secured in its transport position.

In addition a shock absorber is provided between the carrier base and a forward one of the uprights. The shock absorber both cushions downward movement from the transport to the lowered position and provides assistance on return of the carrier from its lowered to its transport position.

A releasable latch is secured to the base member for automatic latching engagement with a lock projection on the forward one of the uprights. With the preferred embodiment the latch includes a release handle. With another embodiment, a cable extends from the latch upwardly through the forward upright and thence rearwardly through the mounting section to a remotely accessible gripping ring. The gripping ring is located at the rear of the carrier and behind the bicycles when the carrier is in use.

The uprights and channels together provide a parallelogram like action without being a true parallelogram. Specifically spacing between upper and lower pivots of the forward uprights is slightly greater than the spacing between the pivots of the rearward upright. This allows the rearward upright to go through an over center action when the carrier is returned from its lowered to its transport position and thus provide the second latch without any cost addition to do so. As a further measure to secure maintenance of the carrier in its transport position, a manually insertable locking pin extends through aligned apertures in the lower mounting channel and the rearward upright.

Accordingly, the object of the invention is to provide a novel and improved bicycle carrier for use with a vehicle receiver type trailer hitch.

DETAILED DESCRIPTION

Figure 1:
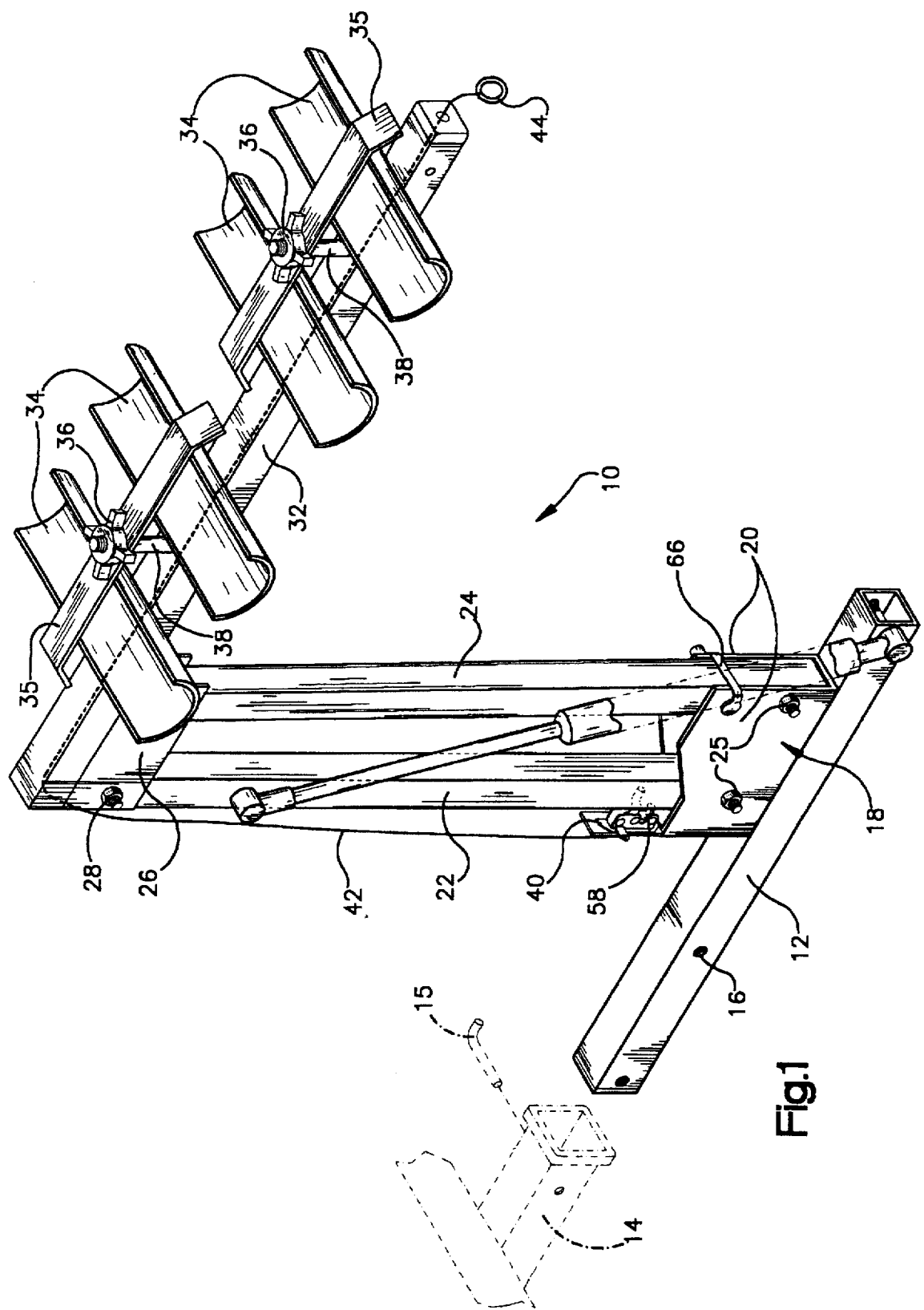
FIG. 1 is a perspective view of the carrier of the present invention in its transport position showing a receiver in phantom lines.

The bicycle carrier of this invention is shown generally at 10 in each of the figures. The carrier 10 includes a tubular base 12 of square cross section. The base 12 is telescopically received in a receiver 14. A pin 15 projects through a receiver aperture and an aligned aperture 16 in the base 12 to retain the base in assembled condition.

In order to minimize movement of the carrier 10 relative to the receiver 14 and a vehicle to which it is connected, a trailer hitch brace of the type sold by the assignee of this patent under the trademark Clamptite is preferably employed. A Clamptite hitch is described and claimed in detail in copending U.S. patent application Ser. No. 08/593, 183 filed by Harley Kravitz on Feb. 1, 1996 under the title Trailer Hitch Locking Device which application is herein incorporated by reference in its entirety.

A base channel 18 is secured to the base 12 as by welding. The base channel has a spaced pair of upstanding arms 20. Front and back uprights 22, 24 are provided. The uprights 22, 24 have lower end portions positioned between the channel arms 20. Fasteners in the form of bolts 25 extend through the arms 20 and the uprights 22, 24 to provide pivotal connections of the arms relative to the base and channel.

A bicycle mounting section channel 26 straddles upper end portions of the uprights 22, 24. Fasteners 28, 30 respectively pivotally connect the uprights 22, 24 to the mounting section channel 26.

A tubular bicycle support arm 32 is provided. The bicycle support arm 32 is fixed to the upper channel 26 as by welding. The support arm 32 projects rearwardly from the channel.

Four bicycle supporting cups 34 are secured to the top of the support arm 32. A pair of clamp arms 35 respectively overlie front and rear pairs of the cups 34 for retaining a bicycle bar in each of the cups. Threaded knobs 36 coact with threaded studs 38 to damp bicycle bars in the cups 34 when bicycles are to be transported.

Figure 4:
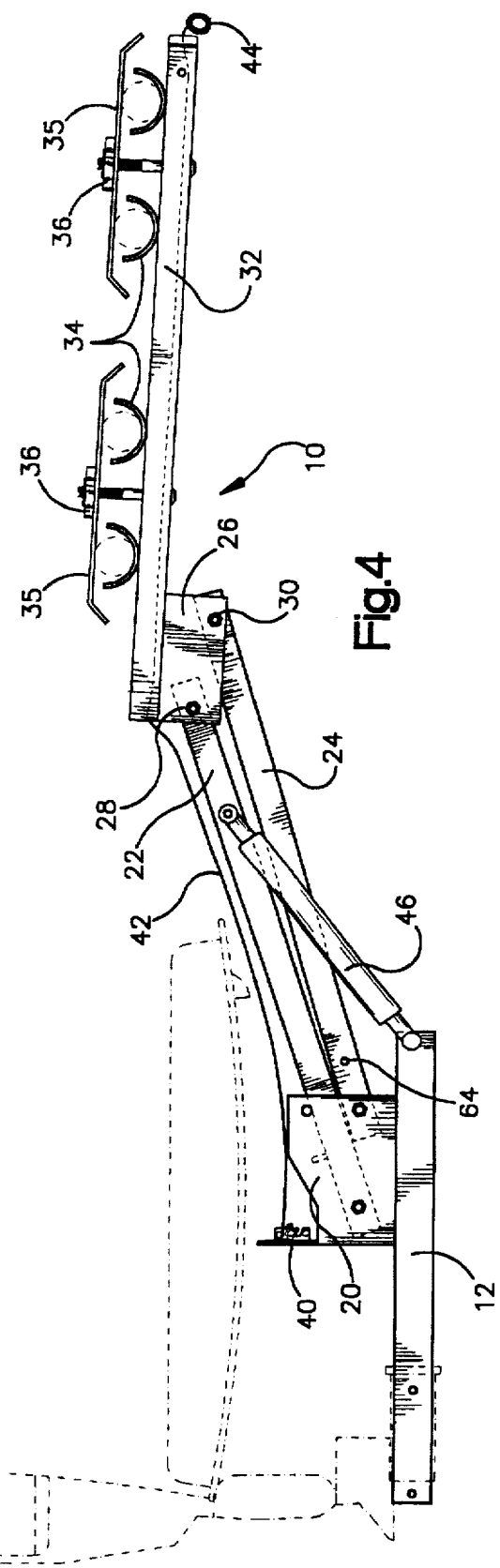
FIG. 4 is a side elevational view of the carrier in its lowered position illustrating a rear portion of a vehicle with a lowered tail gate in phantom lines; and, FIG. 5 is an enlarged perspective view of the preferred latch for retaining the carrier in its transport position of FIGS. 1 and 3.

One of the outstanding features of this invention resides in the double locking of the carrier in its transport position. The double lock provides the security of two locking actions. Two audible clicks produced by the double lock advise an operator that the carrier has completed its movement from its lowered position of FIG. 4 to its upright transport position of the other figures.

Figure 3:
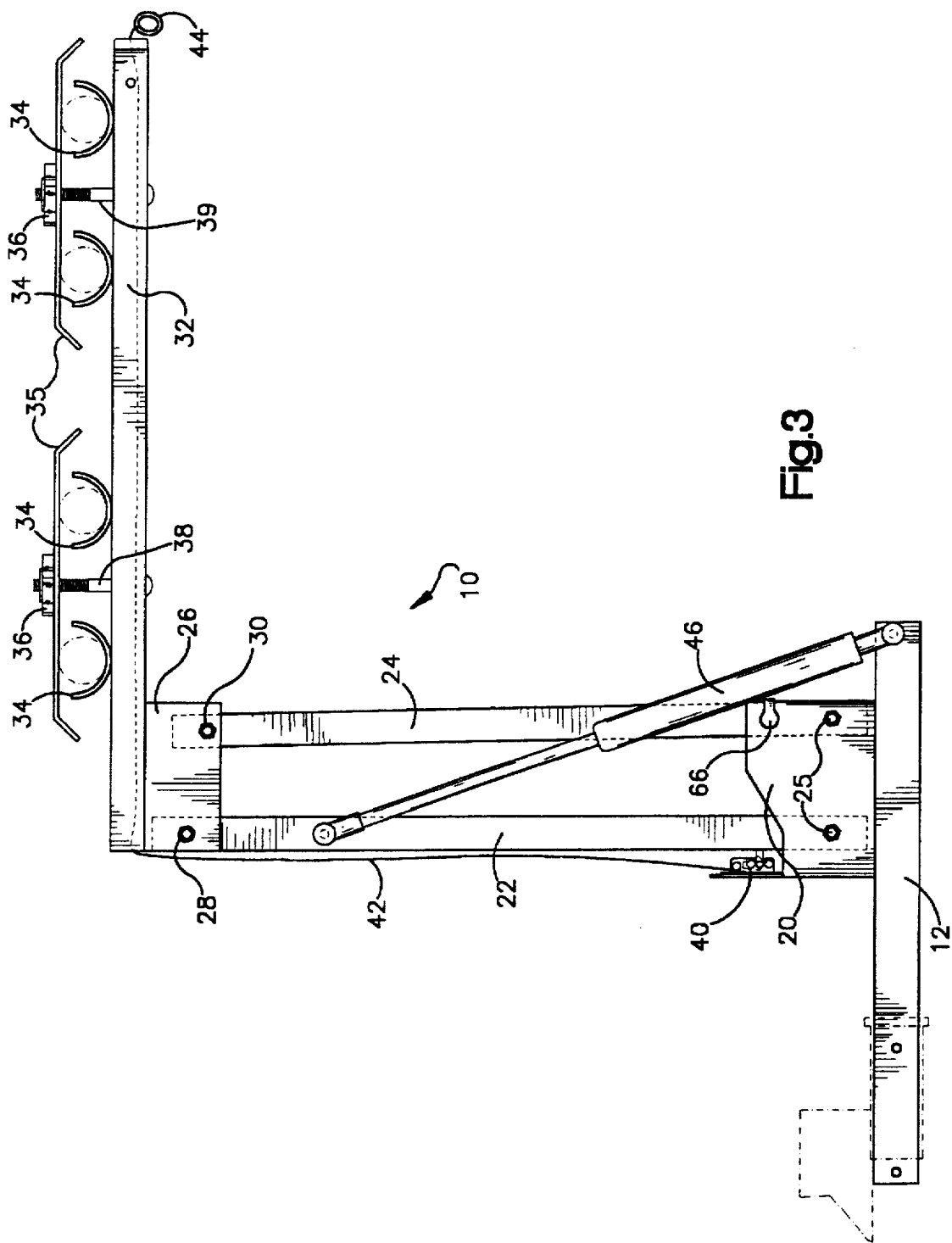
FIG. 3 is a side elevational view of the carrier of FIG. 1 in its upright transport position.

The first of these locks is produced by an arrangement that is almost, but not quite a parallelogram arrangement. Specifically an examination of FIG. 3 in particular will show that the spacing between the fastener 30 and the fastener 25 connected to the rearward upright 24 is less than the spacing between the fastener 28 and the fastener 25 engaging the front upright 22. Because of this different spacing, the fastener 30 passes over center, that is past a vertical plane including the axis of the rear upright fastener 25. Expressed another way, when the carrier is in the position of FIG. 3, the uprights 22, 24 taper toward one another from bottom to top, while in the position of FIG. 4, the uprights 22, 24 taper away from one another from the lower fastener 25 to the upper fasteners 28, 30. Clearly, between these two positions there is a centered positioned when the two uprights are parallel. When in the transport position, as shown in FIG. 3, the weight of the bicycles and the mounting arm tends to pivot the entire bicycle mounting section around the axis of the fastener 28 against resistance of the fastener 30 in the nature of a second class lever.

The second of these locks is a releasable latch 40 is secured to a forward end of the base channel 18. The latch 40 is preferable a rotary flange mounted 300 series latch as manufactured by Eberhard Manufacturing Co. In the embodiment shown in FIG. 1, a release cable 42 is connected to the latch 40. The cable extends upwardly in front of the forward upright 22 and thence rearwardly through the bicycle support 32. A ring 44 is connected to the rearward bitter end of the cable 42. The ring 44 is conveniently located at the rear of the carrier to facilitate an operator gasping the ring and pulling on it and the cable 42 to release the latch 40. Once the latch 40 is released, the carrier may be moved from the position of FIG. 3 to the lowered position of FIG. 4.

Movement is cushioned by a shock absorber 46 which is pivotally connected and interposed between the base 12 and the forward upright 22. The preferred shock absorber is also manufactured by Eberhard Manufacturing Co. The preferred shock absorber is sold under the trademark Powerise Pneumo-Spring®, Model EBB-10100-U. A spring housed within the shock absorber 46 both cushions movement from the transport position of FIG. 3 to the lowered position of FIG. 4 and assists in the return of the carrier from the FIG. 4 to the upright position of FIG. 3.

Figure 5:
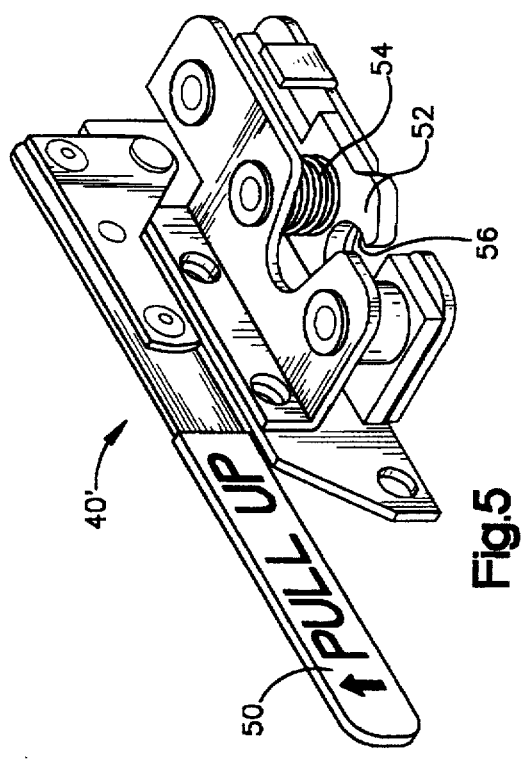

Referring to FIG. 5, an enlarged perspective view of the preferred latch, is identified by the numeral 40'. The latch is the same as the latch of other of the figures with the refinement that a manually actuable release handle 50 is provided in lieu of the cable 42. The lever as shown in FIG. 5 is in its latched position. Lifting the handle 50 will cause a latch member 52 to swing outwardly under the action of a latch spring 54. This winging causes disengagement of the latch member 52 and a "U" shaped latch element 58, carried by the front vertical 22 as seen in FIGS. 1 to 4.

Figure 2:
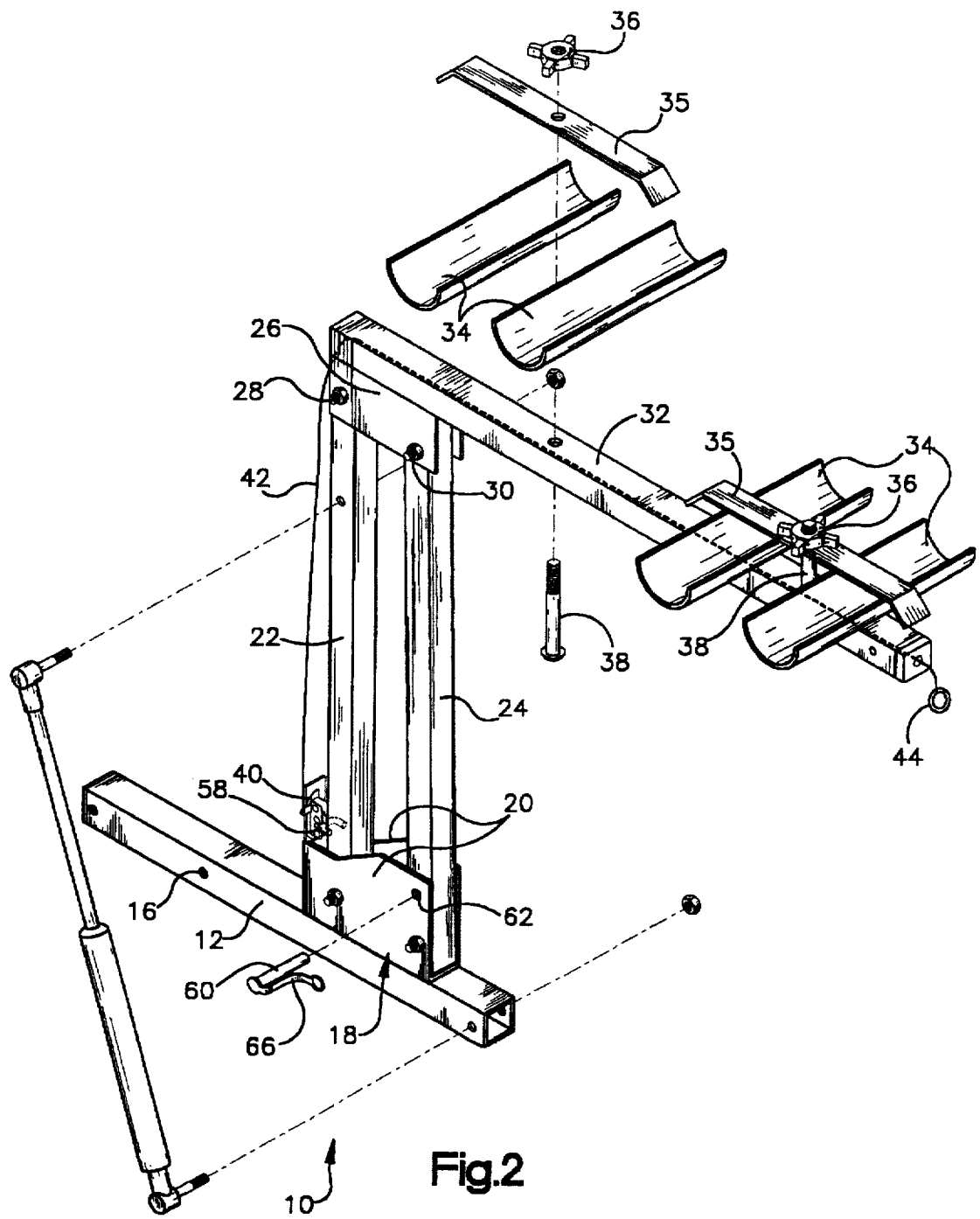
FIG. 2 is an exploded view of the carrier of FIG. 1.

For further security insuring that the carrier remains in its upright transport position, a pin 60 is provided, FIG. 2. The pin is insertable in an aperture 62 in one or both of the arms 20 of the base channel 18 and an aligned aperture 64 in the rear upright 24. The lock pin includes a spring handle 66 which overlies the rear upright 24 and the arms 20 to retain the lock pin 60 in the apertures 62, 64.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

We claim:

1. A bicycle carrier for mounting on a vehicle comprising:
    a) a base adapted to be connected to a vehicle trailer hitch for mounting the carrier on such vehicle;
    b) the base including spaced bracket arms;
    c) a pair of tubular uprights between and pivotally connected to the bracket arms for vertical disposition when the carrier is in use;
    d) an upper channel pivotally connected to the uprights at locations near the tops of the uprights when the carrier is in use;
    e) a mounting section secured to the upper channel and substantially projecting rearwardly from the uprights when the carrier is in use, the mounting section including structure for securing bicycles to the mounting section to depend from the section for transport when the carrier is in use;
    f) a releasable latch interposed between and connected to the base and a first one of the uprights for securing the carrier in a transport position, the latch being releasable to permit pivoting of the uprights relative to the bracket and the channel to move the carrier from its transport to a lowered position when the carrier is in use, the latch also including structure automatically to secure the carrier in its transport position on movement of the carrier from its lowered to its transport position; and,
    g) the pivotal connections of the pair of uprights to the bracket arms are spaced and the pivotal connections of the channel to the uprights are also spaced and the space between the pivotal connections of one of the uprights to the bracket arms and channel is different than the space between the pivotal connections of the other of the uprights to the bracket arms and channel whereby to provide an over center action for a supplemental latch maintained by the weight of the mounting section and any mounted bicycle when the carrier is in its transport position.

2. The carrier of claim 1 wherein a flexible latch release cable is provided, the cable having one end connected to the latch and a remote gripping end.

3. The carrier of claim 2 wherein the gripping end is accessible at a rearward location when the carrier is in use.

4. A bicycle carrier for interconnection with a receiver type trailer hitch comprising:
    a) a tubular base having a rear portion for telescopic interconnection with such a hitch;
    b) a channel bracket secured to the base and having upstanding mounting arms;
    c) a spaced pair of tubular uprights having lower end portions interposed between the mounting arms, the end portions being pivotally connected to the mounting arms at spaced locations;

d) an inverted channel having spaced pivot arms, the uprights each having an upper portion disposed between and pivotally connected to the pivot arms at spaced locations;

e) a bicycle mounting section secured to the channel, the section including a mechanism for securing a bicycle to the carrier for transport;

f) the uprights, channel and section being moveable relative to the base between an upright bicycle transport position and a lowered access position;

g) the space between the upper and lower pivots of one of the uprights being different than the space between the upper and lower pivots of the other of the uprights such that movement between the positions is essentially a parallelogram motion while movement into the transport position produces an over center locking action;

h) a shock absorber interposed between the base and a first of the uprights to cushion movement from the transport to the access position; and, i) a releasable latch interposed between the base and a selected one of the uprights for releasably securing the carrier in its transport position.

5. The carrier of claim 4 wherein the one upright and the first upright are different uprights.

6. The carrier of claim 4 wherein the selected one of the uprights and the first upright are the same upright.

7. The carrier of claim 4 wherein flexible cable is provided, the cable having one end connected to the latch and a remote gripping end.

8. The carrier of claim 7 wherein the gripping end is accessible at a rearward location when the carrier is in use.

9. The carrier of claim 7 wherein the mounting section includes a tube and the cable extends through the mounting section tube.

10. A bicycle carrier for interconnection with a receiver type trailer hitch comprising:

a) a tubular base having a rear portion for telescopic interconnection with such a hitch;

b) a channel bracket secured to the base and having upstanding mounting arms;

c) front and rear of tubular uprights having lower end portions interposed between the mounting arms, the end portions being pivotally connected to the mounting arms at spaced locations;

d) an inverted channel having spaced pivot arms, the uprights each having an upper portion disposed between and pivotally connected to the pivot arms at spaced locations;

e) a bicycle mounting section secured to the channel, the section including a mechanism for securing a bicycle to the carrier for transport;

f) the uprights, channel and section being moveable relative to the base between an upright bicycle transport position and a lowered access position;

g) the space between the upper and lower pivots of the from upright being greater than the space between the upper and lower pivots of the rear upright such that movement between the positions is essentially a parallelogram motion while movement into the transport position produces an over center locking action;

h) a shock absorber interposed between the base and the front upright to cushion movement from the transport to the access position;

i) a releasable latch interposed between and connected to the base and the front upright for securing the carrier in a transport position, the latch being releasable to permit pivoting of the uprights relative to the bracket and the channel to move the carrier from its transport to a lowered position when the carrier is in use, the latch also including structure automatically to secure the carrier in its transport position on movement of the carrier from its lowered to its transport position; and, j) an operator actuable latch release operably connected to the latch.

11. The carrier of claim 10 wherein:

a) the latch release is a flexible cable having one end connected to the latch and a remote gripping end, the gripping end being accessible at a rearward location when the carrier is in use; and, b) the mounting section having a tube and the cable extending through the tube.

12. A bicycle carrier for mounting on a vehicle comprising:

a base adapted to be connected to a vehicle for mounting the carrier on such vehicle;

b) the base including spaced bracket arms;

c) a pair of tubular uprights pivotally connected to the bracket arms for vertical disposition when the carrier is in use;

d) an upper channel pivotally connected to the uprights at locations near the tops of the uprights when the carrier is in use;

e) a mounting section secured to the upper channel and including structure for securing bicycles to the mounting section for transport when the carrier is in use;

f) a releasable latch interposed between and connected to the base and a first one of the uprights for securing the carrier in a transport position, the latch being releasable to permit pivoting of the uprights relative to the bracket and the channel to move the carrier from its transport to a lowered position when the carrier is in use, the latch also including structure automatically to secure the carrier in its transport position on movement of the carrier from its lowered to its transport position;

g) a flexible latch release cable having one end connected to the latch and a remote gripping end; and, h) the mounting section including a tube and the cable extending through the mounting section tube.

* * * * *